United States Patent
Liao et al.

(10) Patent No.: US 9,477,822 B1
(45) Date of Patent: Oct. 25, 2016

(54) SECURE PASSWORD ENTRY FOR ACCESSING REMOTE ONLINE SERVICES

(75) Inventors: En-Yi Liao, Cupertino, CA (US); Juichang Hsu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1311 days.

(21) Appl. No.: 12/938,577

(22) Filed: Nov. 3, 2010

(51) Int. Cl.
  *G06F 21/31* (2013.01)
  *H04L 29/06* (2006.01)

(52) U.S. Cl.
  CPC .............. *G06F 21/31* (2013.01); *H04L 63/08* (2013.01)

(58) Field of Classification Search
  CPC ... G06F 21/31; G06F 21/602; H04L 63/0853
  USPC ......................................................... 713/182
  See application file for complete search history.

(56) References Cited

U.S. PATENT DOCUMENTS

| | | | |
|---|---|---|---|
| 2002/0059170 A1* | 5/2002 | Vange .............................. 707/1 |
| 2005/0177649 A1* | 8/2005 | Chung Geon et al. ........... 710/1 |
| 2007/0101148 A1* | 5/2007 | Schutz et al. ................ 713/182 |
| 2007/0263872 A1 | 11/2007 | Kirkup et al. |
| 2008/0020814 A1* | 1/2008 | Kernene .......................... 463/10 |
| 2008/0263672 A1* | 10/2008 | Chen et al. ..................... 726/26 |
| 2008/0288776 A1* | 11/2008 | Kim .............................. 713/168 |
| 2009/0070595 A1 | 3/2009 | Delia et al. |
| 2010/0037064 A1 | 2/2010 | Ku |
| 2010/0195825 A1 | 8/2010 | Cini |
| 2010/0228994 A1* | 9/2010 | Kang ............................ 713/189 |
| 2012/0079282 A1* | 3/2012 | Lowenstein et al. ......... 713/189 |

* cited by examiner

*Primary Examiner* — Alexander Lagor
(74) *Attorney, Agent, or Firm* — Okamoto & Benedicto LLP

(57) ABSTRACT

A password for accessing an online service is secured by receiving keystroke information of the password at a kernel level. The password is encrypted prior to inputting the encrypted password to an application program at an application level. The encrypted password is transmitted from the kernel level to the application level over an out-of-band-channel. The encrypted password is forwarded to a server computer associated with the online service. The server computer decrypts the encrypted password back to the password to determine if the client computer is authorized to access the online service.

15 Claims, 4 Drawing Sheets

SECURE PASSWORD ENTRY FOR ACCESSING REMOTE ONLINE SERVICES

BACKGROUND OF THE INVENTION

1. Field of the Invention

The present invention relates generally to computer security, and more particularly but not exclusively to methods and apparatus for securing entry of passwords.

2. Description of the Background Art

Keystroke loggers are computer mechanisms that record keyboard entries made on a computer. While capable of being employed for beneficial purposes, keystroke loggers are predominantly used to surreptitiously monitor keyboard entries to steal confidential information such as passwords. In particular, a keystroke logger may comprise malicious codes that log keyboard entries made on a victim computer, and send the logged keyboard entries to a remote computer operated by a cyber criminal. Worse, most victims are unaware that their passwords have already been compromised because keyboard loggers are very difficult to detect.

SUMMARY

In one embodiment, a password for accessing an online service is secured by receiving keystroke information of the password at a kernel level. The password is encrypted prior to inputting the encrypted password to an application program at an application level. The encrypted password is transmitted from the kernel level to the application level over an out-of-band-channel. The encrypted password is forwarded to a server computer associated with the online service. The server computer decrypts the encrypted password back to the password to determine if the client computer is authorized to access the online service.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
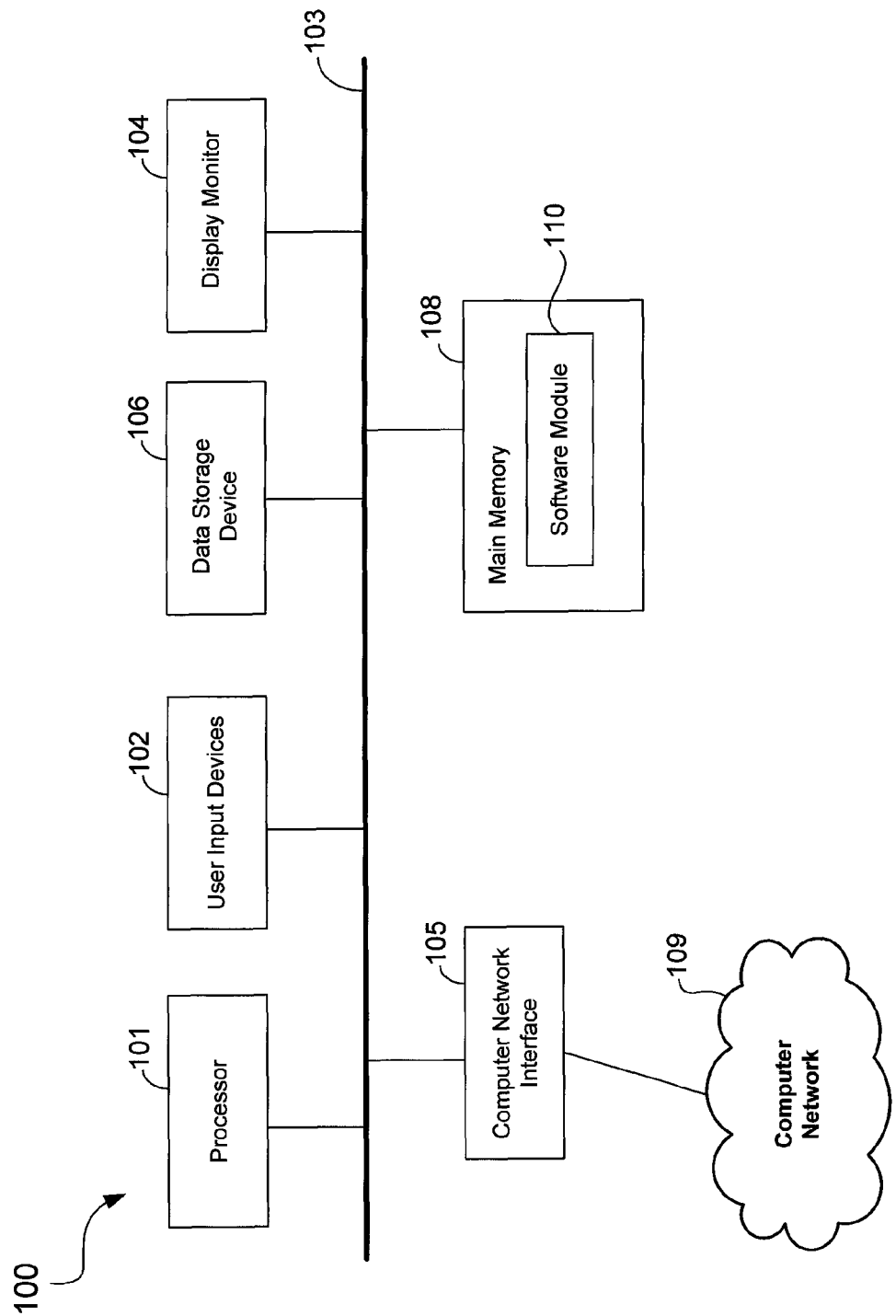
FIG. 1 shows a schematic diagram of a computer in accordance with an embodiment of the present invention.

FIG. 1 shows a schematic diagram of a computer 100 in accordance with an embodiment of the present invention. The computer 100 may be employed as a client computer or a server computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may be loaded from the data storage device 106 to the main memory 108 for execution by the processor 101. The software modules 110 may comprise computer-readable program code components of the client or server computer, for example.

Figure 2:
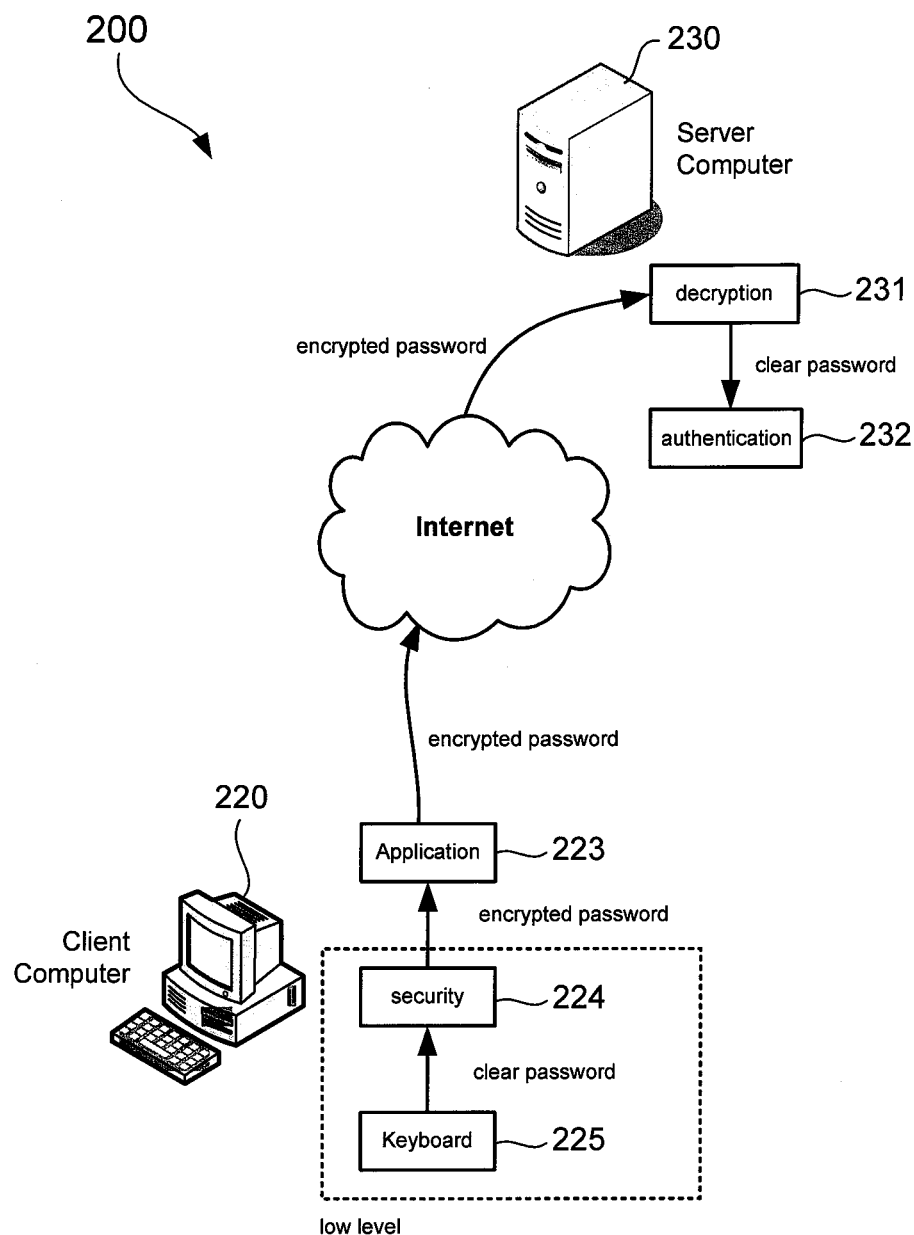
FIG. 2 schematically shows a computer system in accordance with an embodiment of the present invention.

FIG. 2 schematically shows a computer system 200 in accordance with an embodiment of the present invention. The computer system 200 includes a client computer 220 and a server computer 230.

The client computer 220 may comprise a computer employed by a user to access an account on a remote online service. The online service may be for online gaming, banking, e-commerce, or other online service that requires entry of a password or other confidential logon information for access. In the example of FIG. 2, the client computer 220 includes a keyboard 225, a security module 224, and an application program 223.

The application program 223 may comprise computer-readable program code running in the client computer 220. As its name implies, the application program 223 runs at the application level. In the example of FIG. 2, the application program 223 provides at least a user interface to allow the user to send a password to the server computer 230. The application program 223 may comprise an agent, a dashboard, or other program for sending a password to the server computer 230. The application program 223 may also allow the user to interact with the online service provided by the server computer 230. The server computer 230 may host the online service or facilitate connection to another computer that hosts the online service.

The security module 224 may comprise computer-readable program code running in the client computer 220. As will be later described with reference to FIG. 3, the security module 224 may comprise a security agent 224-1 in communication with the application program 223 and a security driver 224-2 in communication with a kernel level program that allows the security driver 224-2 to receive the password entered by the user using the keyboard 225. The security driver 224-2 may communicate with the agent 224-1 over an out-of-band channel to synchronize password reception, encryption, and input to the application program 223.

As shown in FIG. 2, the security module 224 receives a clear, i.e., unencrypted, password from the keyboard 225. The security module 224 encrypts the password and provides the encrypted password to the application program 223. The application program 223 receives the encrypted password and transmits the encrypted password to the remotely located server computer 230 over the Internet. The encrypted password is not decrypted locally in the client computer 220.

The server computer 230 may comprise a server computer associated with providing the online service to the client computer 220. As can be appreciated, the server computer 230 may comprise a single computer or a network of computers that cooperatively operate to provide the functionality of the server computer 230. In the example of FIG. 2, the server computer 230 is configured to decrypt the encrypted password back to the password and to authenticate the password. Once the password is authenticated, the server computer 230 may allow the client computer 220 to access the online service.

In the example of FIG. 2, the server computer 230 includes a decryption module 231 and, optionally, an authentication module 232. The decryption module 231 may comprise computer-readable program code for decrypting the encrypted password transmitted by the application program 223 back to the password. The decryption module 231 and the security module 224 may share the same keys, algorithm, and other information that enables the decryption module 231 to decrypt passwords that have been encrypted by the security module 224. Decrypting the encrypted password at the server computer 230 not only secures the password from possible keystroke loggers in the client computer 220, but also simplifies the encryption/decryption process. For example, using an intermediate computer not associated with the online service between the client computer 220 and the server computer 230 to decrypt the encrypted password would add to the complexity and cost of securing passwords, not to mention additional burden to the user. Performing the encryption of the password at the local client computer and decryption of the password at the server computer associated with the online service make the process relatively transparent to the user. Otherwise, the user would have to setup an additional computer or add extraneous hardware to his client computer just to access the online service.

The authentication module 232 may comprise computer-readable program code for authenticating the password and, based on the password, verifying that the client computer 220 is authorized to access the service offered through the server computer 230. It is to be noted that the authentication module 232 is not necessarily present in the server computer 220. For example, the server computer 230 may simply receive the encrypted password, decrypt the encrypted password back to the password, and store the password in the server computer 230. The server computer 230 may provide the password to other servers associated with the online service.

In addition to decrypting the encrypted password back to the password and authenticating the password, the server computer 230 may provide the online service by hosting the online service or facilitating access to the online service. For example, once the password has been authenticated, the server computer 230 may allow the client computer 220 to access one or more server computers that host the online service.

Figure 3:
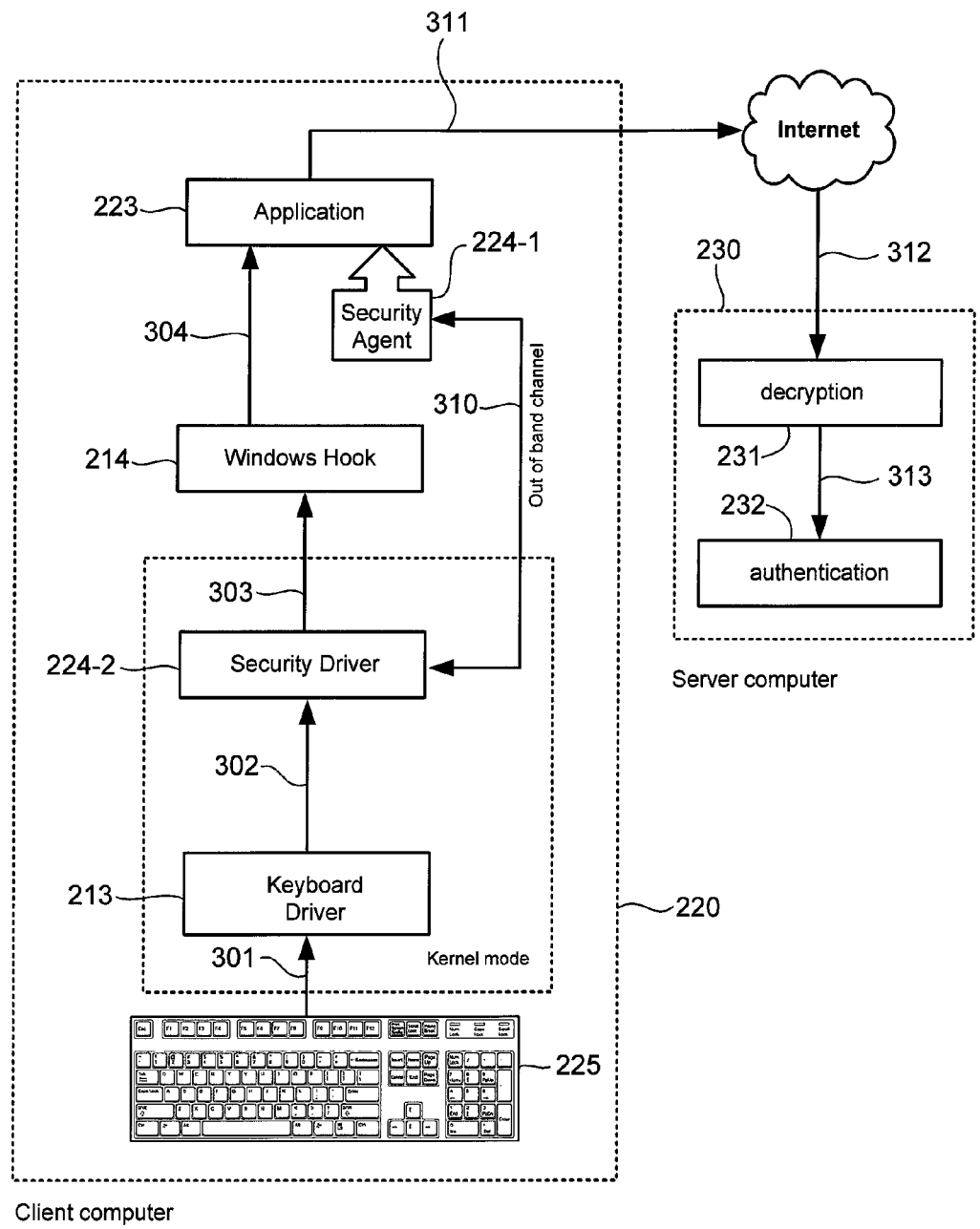
FIG. 3 shows a schematic diagram further illustrating the computer system of FIG. 2.

FIG. 3 shows a schematic diagram further illustrating the computer system 200 in accordance with an embodiment of the present invention. In the example of FIG. 3, the client computer 220 includes the application program 223, the security module 224 comprising the security agent 224-1 and the security driver 224-2, a windows hook 214, a keyboard driver 213, and the keyboard 225. The keyboard driver 213 and the security driver 224-2 run at kernel level (i.e., in kernel mode). The application program 223, security agent 224-1, and the windows hook 214 run at the application level.

The application program 223 may receive keyboard input over one of at least two channels. The first channel, referred to as an in-band channel, comprises a conventional channel for receiving keyboard input. The in-band channel is the channel used for normal keystroke processing. In the example of FIG. 3, the client computer 220 runs the Microsoft Windows™ operating system, where the in-band channel may comprise the path from the keyboard 225 to the keyboard driver 213 (arrow 301), to the security driver 224-2 (arrow 302), and to the application program 223 (arrows 303, 304). The Windows hook 214 is shown in FIG. 3 to illustrate that other programs may place a hook on the in-band channel to monitor keystroke information intended for the application 223. Such a hook may be placed by a keystroke logger to steal keystroke information. The Windows hook 214 may or may not be present in the client computer 220.

When a user presses a key on the keyboard 225, the keyboard 225 sends keystroke information, e.g., scan code or other information for identifying what key has been pressed, to the keyboard driver 213 at kernel level. During normal operation (i.e., not password entry), the security driver 224-2 receives the keystroke information and forwards the keystroke information to the application program 223 over the in-band channel. The in-band channel is especially vulnerable to unauthorized monitoring because keystroke loggers are typically designed to exploit this path, e.g., by using the Windows hook 214. One way to prevent keystroke loggers from stealing information along the in-band channel is to encrypt individual keystroke information as received from the keyboard 225. However, this approach may complicate keystroke processing as the encryption will be performed on all keystrokes for all application programs.

The security agent 224-1 may comprise computer-readable program code for passing password or other confidential logon information to the application program 223. In one embodiment, the security agent 224-1 is configured to monitor the application program 223 to detect when a user will enter a password to the application program 223. For example, the security agent 224-1 may be configured to detect for a password entry field in the application program 223. As another example, the security agent 224-1 may be alerted by the application program 223 when the application program 223 is expecting a password from the user, such as when the application program 223 displays a password input box for the user to enter a password. The security agent 224-1 may be integrated with the application program 223 or be made available as a separate module. The security agent 224-1 may be made available as user mode library for ease of product integration with different suppliers of application programs.

The security agent 224-1 and the security driver 224-2 may communicate over an out-of-band channel (arrow 310). The out-of-band channel is not accessible to any program not associated with securing the password. In one embodiment, the out-of-band channel is used exclusively by the security agent 224-1 and the security driver 224-2. This advantageously prevents keystroke loggers and other malicious codes from snooping on the out-of-band channel. In one embodiment, the out-of-band channel is implemented using the DeviceIoControl function of the Microsoft Windows™ operating system. In response to detecting that the application program 223 will receive a password entry, the security agent 224-1 is configured to signal the security driver 224-2 to receive a password from the keyboard driver 213, encrypt the password, and forward the encrypted password to the security agent 224-1 over the out-of-band channel rather than directly to the application 223 over the in-band channel.

The security driver 224-2 may comprise computer readable program code for receiving a password entered by way of the keyboard 225, encrypting the password, and providing the encrypted password to the security agent 224-1 over the out-of-band channel. During normal operation when a password or other confidential logon information is not being entered by the user, the security driver 224-2 is configured to route keystroke information to the application 223 over the in-band channel.

The security driver 224-2 may be implemented as a Windows™ operating system kernel driver that is inserted into the existing driver stack to receive keystroke information from the keyboard driver 213. In that case, the keyboard driver 213 may comprise a keyboard filter driver and a keyboard function driver, and the security driver 224-2 receives keystroke information from the keyboard filter driver. As can be appreciated, the security driver 224-2 may be placed anywhere along the keystroke transmission path at kernel level.

The security driver 224-2 may route keystroke information to the in-band channel during normal operation, and to the out-band-channel during password entry. In response to receiving a signal from the security agent 224-1 to start receiving a password, the security driver 224-2 prevents transmission of keystroke information over the in-band channel. Instead, the security 224-2 receives keystroke information for the password from the keyboard driver 213, encrypts the password, and provides the password to the security agent 224-1 over the out-of-band channel.

In one embodiment, the security agent 224-1 does not perform encryption until the user has finished entering the password. That is, in one embodiment, rather than encrypting each individual character entry, the security driver 224-2 encrypts the entire password as a single word or phrase. The end of password entry may be detected by, for example, detecting pressing of the return key, detecting shift of focus to another window, detecting shift of focus to another input field, etc. The security driver 224-2 may also be configured to encrypt individual keystroke information (i.e., encrypt a single character) and forward the encrypted individual keystroke information to the security agent 224-1 over the out-of-band channel.

Upon receipt of the password, the security driver 224-2 forwards the encrypted password to the security agent 224-1 over the out-of-band channel, and resumes allowing keystroke information to be forwarded over the in-band channel. The security agent 224-1 receives the encrypted password and inputs the encrypted password to the application program 223. The password is still encrypted as provided to the application program 223 and as sent to the server computer 230. That is, the encrypted password is not decrypted locally in the client computer 220. The password is thus secured, preventing theft of the password by screen capture, keystroke recording, clipboard and text box capture, and monitoring of process memory, among other keystroke logging schemes. The application program 223 sends the encrypted password to the server computer 230 over the Internet (arrow 311).

The encrypted password is received in the server computer 230 (arrow 312). There, the decryption module 231 decrypts the encrypted password back to the password. Optionally, the authentication module 232 receives the password (arrow 313) and authenticates the password to determine if the client computer 220 is authorized to access the online service. When authentication is not performed by the server computer 230, the server computer 230 simply stores the password for later retrieval or forwards the password to another server computer associated with the online service.

Figure 4:
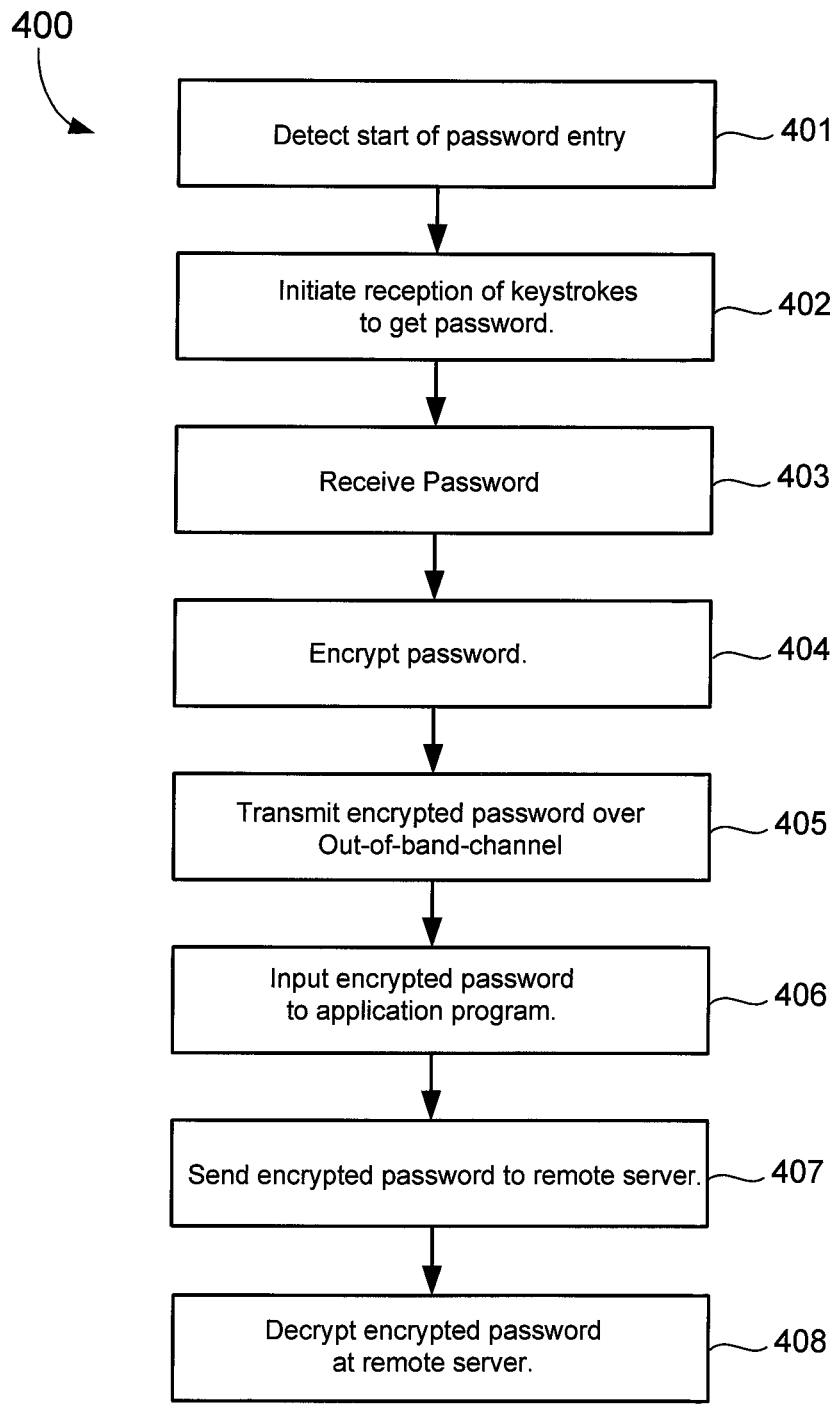
FIG. 4 shows a flow diagram of a method of securing password entry for accessing remote online services in accordance with an embodiment of the present invention.

FIG. 4 shows a flow diagram of a method 400 of securing password entry for accessing remote online services in accordance with an embodiment of the present invention. The method 400 may be performed by the computer system 200, with steps 401-407 performed by the client computer 220, and step 408 performed by the server computer 230. The client computer 220 and the server computer 230 may perform the aforementioned steps as programmed with computer-readable program codes previously discussed.

In the example of FIG. 4, the security agent 224-1 detects start of password entry to the application program 223 (step 401). In response, the security agent 224-1 sends a signal to the security driver 224-2 to initiate receiving a password entered by way of the keyboard 225 and stops transmitting keystroke information over the in-band channel (step 402). At kernel level, the security driver 224-2 receives a plurality of keystroke information comprising the password, with each keystroke information identifying a key of the keyboard 225 that has been actuated. The security driver 224-2 assembles the plurality of received keystroke information into the password at the end of password entry (step 403). The end of password entry may be detected by the security agent 224-1, which so informs the security driver 224-2, for example.

The security driver 224-2 encrypts the password (step 404). In one embodiment, the security driver 224-2 encrypts the entire password as a whole. In other embodiments, the security driver 224-2 encrypts individual keystroke information of the password. The security driver 224-2 provides the encrypted password to the security agent 224-1 over the out-of-band channel (step 405). In turn, the security agent 224-1 inputs the encrypted password to the application program 223 (step 406).

The application program 223 sends the encrypted password to the server computer 230 (step 407). There, the decryption module 231 decrypts the encrypted password back to the password (step of 408).

As can be appreciated, embodiments of the present invention provide advantages heretofore unrealized. First, embodiments of the present invention do not necessarily require extraneous hardware components, such as intermediate computers, dongles, and special keyboards. Second, embodiments of the present invention may be implemented transparent to the user and with minimal impact to computing resources. Third, embodiments of the present invention provide a very secure way of entering passwords for accessing remote online services.

Methods and apparatus for securing password entry for accessing remote online services have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of securing password entry for accessing a remote online service, the method comprising:
   a client computer providing keystroke information from a keyboard to an application program over an in-band channel used for normal keystroke processing and when a password is not being provided to the application program;

the client computer detecting start of entry of the password to the application program to access a remote online service;

in response to detecting the start of entry of the password, the client computer initiating interception of a plurality of keystroke information from the keyboard at a kernel level, the plurality of keystroke information comprising the password;

the client computer encrypting the password at the kernel level and providing the encrypted password over an out-of-band channel instead of over the in-band channel to the application program running at the application level in the client computer; and the client computer providing the encrypted password to a server computer providing the remote online service.

2. The method of claim 1 further comprising:

the server computer decrypting the encrypted password back to the password.

3. The method of claim 1 wherein the client computer assembles the plurality of keystroke information into the password before encrypting the password.

4. The method of claim 1 wherein the client computer encrypts each individual keystroke information of the plurality of keystroke information comprising the password.

5. The method of claim 1 wherein the remote online service comprises online gaming.

6. The method of claim 1 wherein the remote online service comprises online banking.

7. The method of claim 1 wherein the server computer hosts the remote online service.

8. A computer system comprising:

a client computer configured to intercept a plurality of keystroke information at a kernel level, assemble the keystroke information into a password for accessing an online service, encrypt the password into an encrypted password, provide the encrypted password over an out-of-band channel instead of over an in-band channel to an application program running in the client computer, forward the encrypted password to a server computer over the Internet, wherein the in-band channel is used by the client computer for normal keystroke processing not involving the password; and the server computer providing the online service, the server computer being configured to receive the encrypted password and decrypt the encrypted password back into the password.

9. The computer system of claim 8 wherein the server computer provides the online service by facilitating connection of the client computer to another computer hosting the online service.

10. The computer system of claim 8 wherein the server computer hosts the online service.

11. The computer system of claim 8 wherein the online service comprises online gaming.

12. A computer-implemented method of securing a password for accessing an online service, the computer-implemented method comprising:

providing keystroke information from a keyboard to an application program over an in-band channel used for normal keystroke processing when a password is not being provided to the application program;

receiving a plurality of keystroke information comprising the password at a kernel level;

encrypting the password at the kernel level to generate an encrypted password;

providing the encrypted password over an out-of-band channel instead of the in-band channel to the application program running at an application level in the client computer; and forwarding the encrypted password to a server computer associated with the online service for decryption.

13. The computer-implemented method of claim 12 wherein the server computer hosts the online service.

14. The computer-implemented method of claim 12 wherein the server computer decrypts the encrypted password back to the password and authenticates the password.

15. The computer-implemented method of claim 12 wherein the encrypted password is transmitted from the kernel level to the application level over an out-of-band channel.

\* \* \* \* \*